United States Patent [19]

Norton et al.

[11] Patent Number: 5,372,169

[45] Date of Patent: Dec. 13, 1994

[54] BICYCLE COVER

[76] Inventors: Merritt Norton, 2043 Bush St. Apt. 2, San Francisco, Calif. 94115; Sigrid L. Norton, 4004 N. 850 E., Provo, Utah 84604

[21] Appl. No.: 218,680

[22] Filed: Mar. 29, 1994

[51] Int. Cl.$^5$ .............................................. B60R 9/10
[52] U.S. Cl. .................................. 150/167; 296/78.1
[58] Field of Search .................... 150/154, 166, 167; 296/78.1, 136; 266/335

[56] References Cited

U.S. PATENT DOCUMENTS

| | | | |
|---|---|---|---|
| 3,044,516 | 7/1962 | Stoll | 150/166 |
| 3,968,913 | 7/1976 | Weed et al. | 150/166 X |
| 4,009,744 | 3/1977 | Joslyn | 150/167 |
| 4,356,831 | 11/1982 | Adams | 150/167 |
| 4,378,883 | 4/1983 | Profeta | 150/167 X |
| 4,976,389 | 12/1990 | McLelland et al. | 150/167 X |
| 4,979,339 | 12/1990 | Jones et al. | 150/166 X |
| 5,282,502 | 2/1994 | Ballard | 296/78.1 X |

Primary Examiner—Allan N. Shoap
Assistant Examiner—Christopher McDonald
Attorney, Agent, or Firm—Delbert R. Phillips

[57] ABSTRACT

A water resistant cover in the form of a sack for wheeled vehicles is described. The cover accommodates wheeled vehicles such as bicycles, mopeds, motorcycles, or the like. The sack packs into itself by means of a sleeve opening attached to the cover and therefore does not require a separate pouch for storage. This sleeve can be snugly closed around a lock to prevent moisture from entering into the interior of the sack while it covers the vehicle. A cable is attached to the interior of the sack which may be pulled through the sleeve opening to provide a means of locking the packed cover to the vehicle. This cable also provides a means of securing the cover to the vehicle while it is covering the vehicle.

20 Claims, 3 Drawing Sheets

BICYCLE COVER

BACKGROUND OF INVENTION

This invention relates to a water resistant cover for wheeled vehicles such as bicycles. The cover described in this invention may be modified to accommodate other wheeled vehicles such as mopeds, motorcycles, and the like. The cover of this invention not only provides a secure, water resistant, protective sack for the vehicle, but also is a vehicle protector that packs into itself and therefore does not require a separate pouch for storage.

Since many people such as students, young professionals and apartment dwellers find it increasingly desirable to use bicycles for recreation and commuting to work or school, a protected and secure environment is increasingly necessary to store bicycles on patios porches or terraces while protected against weather and vandalism.

The prior art describes a variety of covers to protect wheeled vehicles such as motorcycles or bicycles from the weather. For example, in British Pat. No. 480,382 dated Feb. 22, 1938, such a cover is described which fits over a motorcycle and is secured by elastic straps extending underneath the vehicle. In German Pat. No. 806,642 dated Jun. 14, 1951, a similar cover for a motorcycle is described with a hasp-type lock carried by the cover which will accommodate a padlock. The cover further includes a base however, and is clearly not portable. In German Pat. No. 950,059 dated Oct. 4, 1956, a similar motorcycle cover without the base is described. However, this cover utilizes diagonal drawstrings to tighten the cover about the motorcycle and therefore is not amenable to locking. In Norwegian Pat. No. 88,116 dated Aug. 4, 1956, a collapsible cover is described which will cover a bicycle and may be collapsed into a carrying case mounted on the cover. This cover also does not provide for securing the cover about the bicycle, or locking the cover to the bicycle. Finally in U.S. Pat. No. 4,356,831 there is described a U-Shaped protective collapsible bicycle cover with provision to lock the cover and bicycle to a stationary object, however, the provision to lock the bicycle is not impervious to the elements it is merely 4 holes that allow a chain to be threaded through. None of the art describes or suggests a cover that does not require a separate compartment for storage and a provision for preventing water or weather from reaching the bicycle through the openings which accommodate the locking mechanism and provisions to lock the cover to the frame of the vehicle when no stationary object is available.

SUMMARY OF THE INVENTION

It is an object of this invention to provide a portable water resistant protective cover for a bicycle or similar vehicle, which provides a convenient method of storing the protective cover after it has been removed from the bicycle.

It is another object of this invention to provide a water resistant, collapsible cover fitting snugly around the bicycle tires, which also has a sleeve to accommodate virtually all locking mechanisms, allowing the vehicle to be secured to a stationary object without permitting water or moisture to penetrate the opening which accommodates the lock.

It is yet another object of this invention to provide a secure, water resistant, protective cover for a bicycle, tricycle, moped, or the like, which when not is use, can be stuffed into a pocket that is an integral part of the cover.

A further object of this invention is to provide a cover for a bicycle or other vehicle that may be either locked to the bicycle through a sleeve to an external stationary object, or locked to a stationary object which is enclosed by the cover.

A still further object of the invention is to provide a cover for a bicycle or other vehicle that can be attached to the seat post of the bicycle after being stuffed into the pocket that is formed when the end of the sleeve is closed to form a compact package.

The vehicle cover is made of flexible, lightweight, durable, water-resistant material formed from multiple pieces of the material, which are permanently fastened together to form a sack that surrounds the vehicle. The flexible lightweight, durable water-resistant material may be rubberized canvas, nylon, dacron, neoprene or other material that resists the penetration of water. Permanently fastened includes sewing, stitching, gluing or any other type of permanent bonding. The sack will accommodate a two or three wheeled vehicle such as a bicycle, tricycle, motorcycle, motorbike, moped or the like. The sack surrounding the bicycle has a closed top with an opening at the bottom. Hooking means such as hooks or strips of synthetic material having hook and loop fasteners which adhere when pressed together ie.(VELCRO), are positioned on the inside of the bottom opening of the sack to close the bottom edge of the sack between the front and rear wheels of the vehicle. Further hooking means such as hooks or strips of synthetic material having hook and loop fasteners which adhere when pressed together ie.(VELCRO) are attached to the inside of the cover edge adjacent to the front and rear wheels of the vehicle, providing a method of securing the cover through the wheel spokes. Additional closing=means such as a drawstring, elastic band, belt or shock-cord, extending around the circumference of the bottom of the sack, provide a method for tightly sealing the cover around the bottom of the vehicle.

A sleeve of fabric which can accommodate a locking mechanism, extending out of the sack, is positioned to surround a locking mechanism that locks the bicycle to a stationary object. The sleeve which is open on both ends has a first closure means on the exterior opening and a second closure means on the interior opening. The first and second closure means may be a drawstring, elastic band, zipper or strips or synthetic material having hook and loop fasteners which adhere when pressed together ie.(VELCRO). The sleeve opening on the outside of the cover may be closed around the locking means to protect the vehicle from the weather. After removal of the cover from the vehicle, one sleeve end is closed forming a pocket. The cover is then stuffed into the pocket. After the packing process the other end of the sleeve is closed thereby forming a compact package.

Two strips of material which may be in the form of webbing are attached to the sleeve. These strips can be attached with a fastening means such as hooks, belt and buckle, or strips of synthetic material having hook and loop fasteners which adhere when pressed together ie.(VELCRO) to form a belt which may secure the compact package to the vehicle. This belt can also function as a carrying handle for the packed cover.

A cable means is attached on the inner surface of the cover, which may consist of plastic coated metal cable, nylon cord, small metal chain or the like. The cable means is affixed to the interior surface of the sack. The cable means may fasten the cover to the bicycle through a cable lock, allowing the cover and bicycle to be locked to the rack When the cover is enclosing both the rack and the bicycle. The cable means is fastened to the cover by way of a grommet and crimping tube which prevents removal of the cable means from the cover without cutting the cover.

When the cover encloses both the rack and the bicycle, the exterior end of the sleeve extending from the cover is snugly closed by the closing means to prevent moisture from entering into the interior of the cover. If the covered bicycle is not being locked to a rack or a stationary object, the cable means may be used to lock the cover to the frame of the bicycle.

When the cover is packed into itself, the cable means may extend through the opening of the sleeve and may be used to securely fasten the packed cover to the bicycle by way of a bicycle lock. This cable means may also fasten the packed cover to any other stationary object, such as a bike rack, by way of a lock.

Optionally, smaller sleeves with closure means, provide openings for hanging the bicycle (with the cover in place), on the members of a bicycle rack that engage the bicycle frame, allowing the members to extend through the sack to support the bicycle. The closure means on these smaller sleeves will snug the openings in the cover against hooks of the bicycle rack to seal the cover against rain or snow.

A BRIEF DESCRIPTION OF THE DRAWINGS

DETAILED DESCRIPTION OF THE INVENTION

The bicycle cover (1) is formed from multiple pieces of a water-resistant fabric that is treated to retard ripping ie. (RIPESTOP NYLON). The pieces are sewn together to form a sack with an opening that has a shock-cord (5) which functions as a draw string, encircling the circumference of the opening. Strips of synthetic material having hook and loop fasteners which adhere when pressed together ie. (VELCRO) (17),(18),(19) are affixed to the inside edge of the opening of the sack. Strips of synthetic material having hook and loop fasteners which adhere when pressed together ie. (VELCRO) (18) are positioned to close the edge of the opening between the front and rear wheel. Strips of synthetic material having hook and loop fasteners which adhere when pressed together ie. (VELCRO) (17) and (19) are positioned to fasten the edge of the opening through the front wheel (16) and rear wheel (15) of the bicycle. The shock-cord (5) may be drawn tight to fasten the cover securely around the wheels and pedals to prevent moisture from entering into the interior of the sack.

Figure 1:
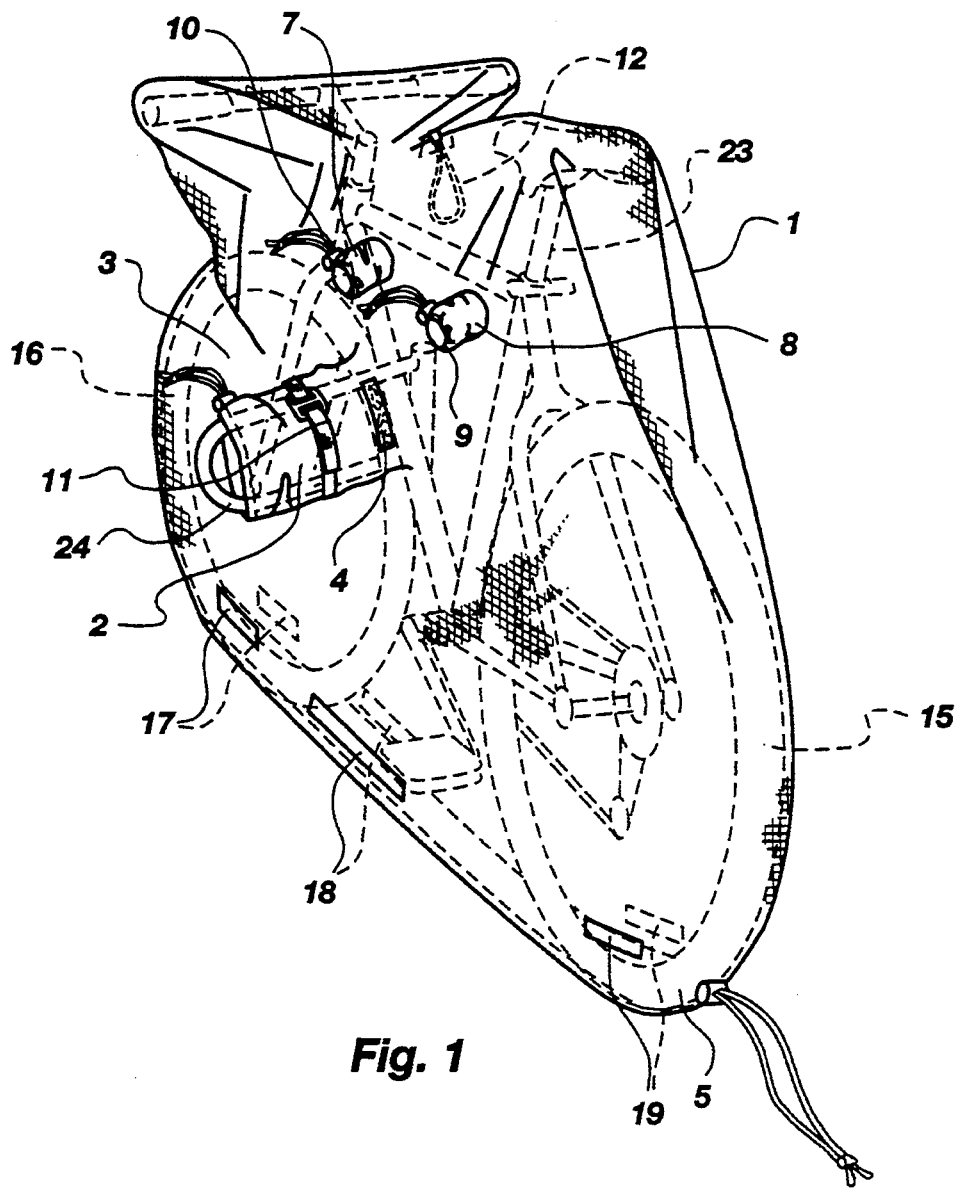
FIG. 1 is a depiction of the cover in place on a bicycle.
Figure 2:
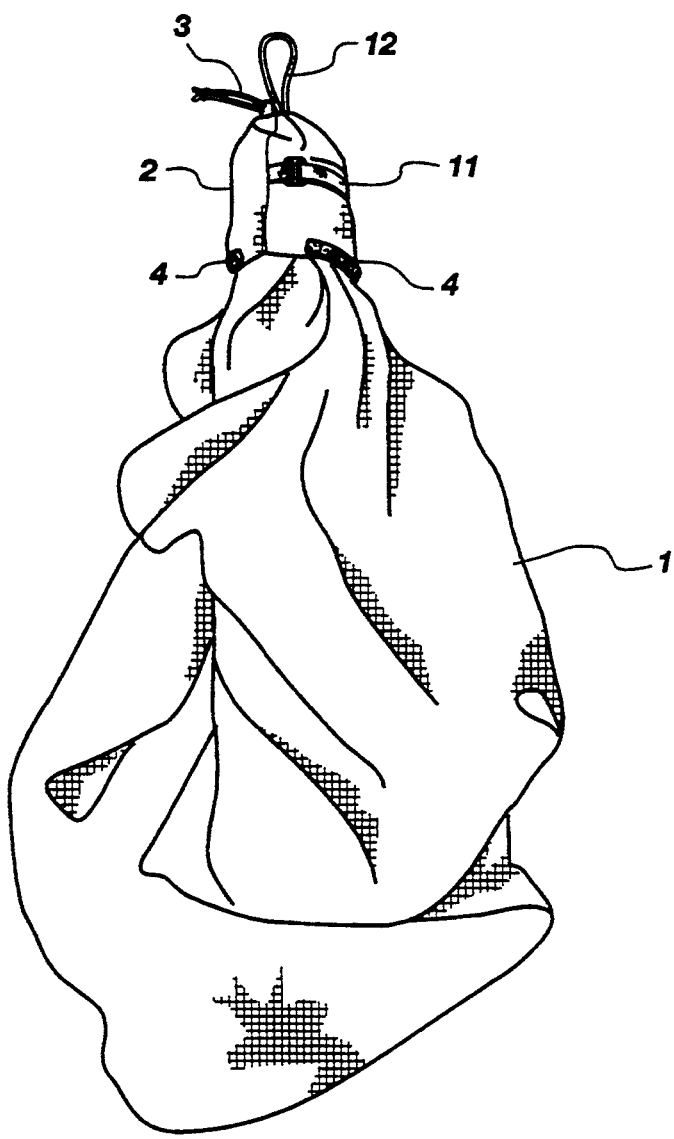
FIG. 2 shows the cover removed from the bike and ready to be packed into the pocket formed by the closed sleeve.
Figure 3:
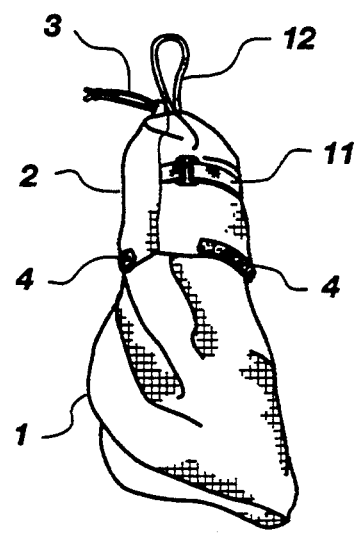
FIG. 3 illustrates the cover partially packed into the pocket formed by the closed sleeve.
Figure 4:
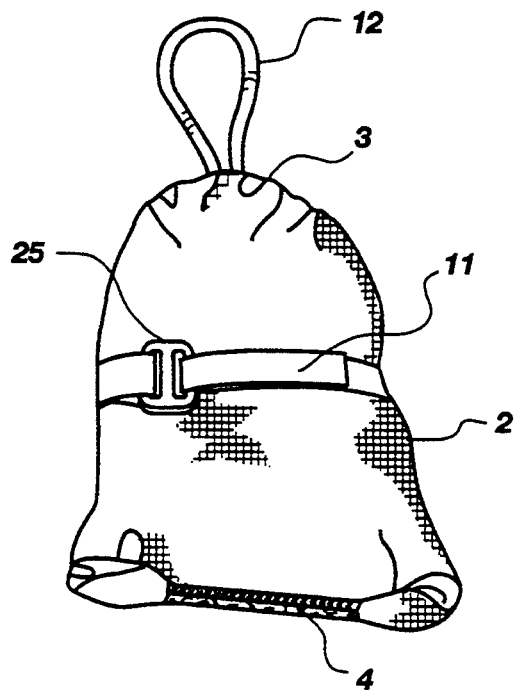
FIG. 4 shows a view of the packed cover in the closed sleeve, with the cable means protruding from the closed opening of the sleeve, and the other end closed with strips of synthetic material having hook and loop fasteners which adhere when pressed together ie. (VELCRO).

A sleeve of fabric (2) accommodating a lock (24), extends out of the sack. The sleeve (2), which is open on both ends, has an elasticized drawstring (3) attached to the exterior opening and strips of synthetic material having hook and loop fasteners which adhere when pressed together ie. (VELCRO) (4) attached to the interior opening of the sleeve. The elasticized drawstring (3) may be closed around the lock (24) to prevent moisture from entering into the interior of the sack. After removal of the cover (1) from the bicycle the elasticized drawstring (3) is closed forming a pocket (FIG. 2). The cover (1) is then stuffed into the pocket (FIG. 3). After the packing process the strips of synthetic material having hook and loop fasteners which adhere when pressed together ie. (VELCRO) (4) are pressed together thereby forming a compact package (FIG. 4). Two strips of material (11) are attached to the sleeve (2). The strips (11) are connected with a buckle (25) after the cover is packed. When the strips are buckled together they may attach the packed cover to the bicycle seat post (25).

Figure 5:
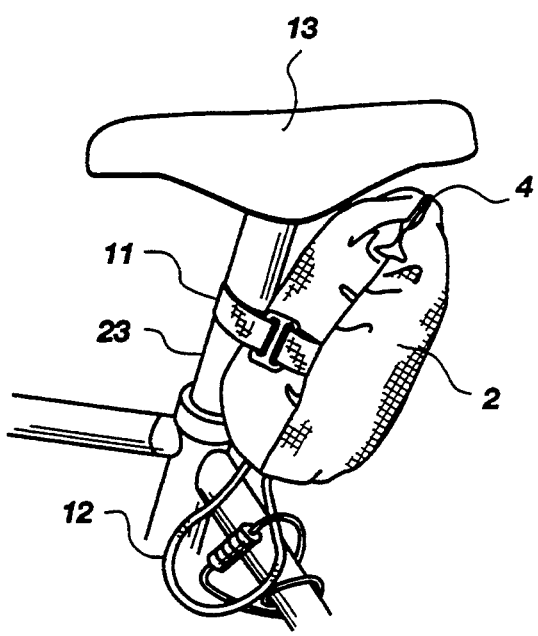
FIG. 5 depicts the packed cover attached to the bicycle seat post and locked by the cable to the bicycle frame.
Figure 6:
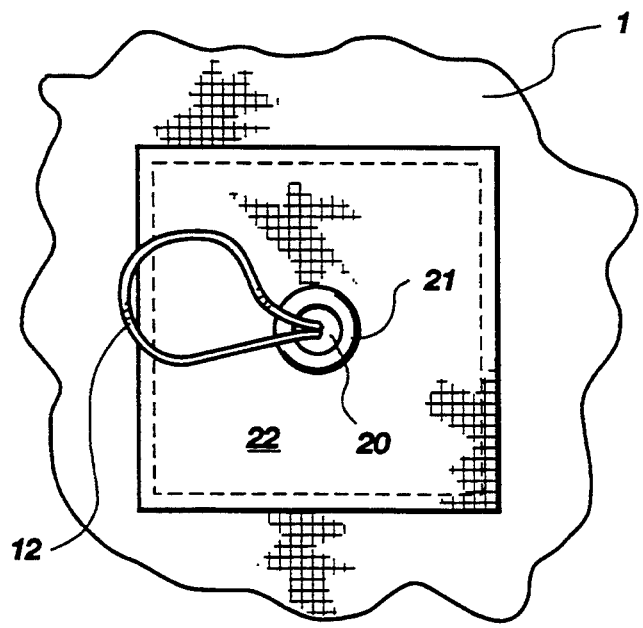
FIG. 6 is an inside view of the cable attachment by a grommet to a fabric patch attached to the inner surface of the bicycle cover.
Figure 7:
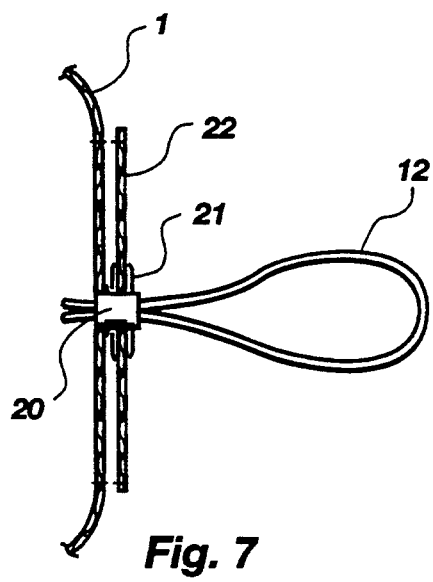
FIG. 7 is a side view of the cable attachment to the inner surface of the cover which shows the grommet, crimping tool and reinforcing fabric patch on the inner surface of the cover.

Affixed to the inner surface of the cover (1) is a cable (12) attached by way of a grommet (21) a crimping tube (20) and a reinforcing fabric patch (22). When the cover is packed (FIG. 4) the cable (12) extends through the opening of the sleeve (2) and can be used to lock the packed cover to the frame of the bicycle (see FIG. 5).

Sleeves (7),(8) which may or may not be present, with closure means (9), (10) provide openings for hanging the bicycle with the cover in place, on two members of a bicycle rack by engaging the frame of a bicycle.

As will be obvious to those skilled in the art, this invention may be adapted to use with any conventional type of wheeled vehicle, such as a bicycle, motorcycle, tricycle, moped, or the like, in which case the dimensions will be altered accordingly. The cover is also intended to be adapted to any conventional type of bicycle lock, intended to capture the frame or wheels, or a single wheel, and secure the same to a post, bicycle rack, tree, or the like.

The invention may be embodied in other specific forms without departing from the spirit or essential characteristics thereof. The present embodiments are, therefore to be considered in all respects as illustrative and not restrictive, the scope of the invention being indicated by the appended claims rather than by the foregoing description; and all changes will come within the meaning and range of equivalency of the claims are therefore intended to be embraced therein.

What is claimed and desired to be secured by Letter Patent is:

1. A cover for covering a vehicle comprising: multiple pieces of a flexible lightweight, durable, water resistant material;

said pieces are permanently fastened together to form a sack;

said sack surrounds said vehicle;

said sack has a closed top and an opening at the bottom;

multiple closing means are positioned around the circumference of the bottom of said sack;

a sleeve of flexible lightweight, durable, water resistant material which is an integrally formed part of said sack extending out of said sack;

said sleeve having an exterior opening and interior opening;

said sleeve being formed to accommodate a locking mechanism attached to said vehicle;

said sleeve having a means for closing said exterior opening;

said sleeve having a second means for closing said interior opening and;

said sleeve forming a pocket in which the remainder of said sack is stuffed when said exterior opening is closed.

2. A vehicle cover as defined in claim 1 wherein said vehicle is selected from the group consisting of bicycles, motorcycles, motorbikes, tricycles, and mopeds.

3. A vehicle cover as defined in claim 1 wherein said vehicle is a bicycle.

4. A vehicle cover as defined in claim 1 wherein said means for closing said exterior opening is selected from the group consisting of a drawstring, strips of synthetic material having hook and loop fasteners which adhere when pressed together (VELCRO) and hooks.

5. A vehicle cover as defined in claim 4 wherein said means for closing said exterior opening is a drawstring.

6. A vehicle cover as defined in claim 1 wherein said second means for closing said interior opening is selected from the group consisting of a drawstring, strips of synthetic material having hook and loop fasteners which adhere when pressed together (VELCRO), and hooks.

7. A vehicle cover as defined in claim 6 wherein said second means for closing said interior opening is strips of synthetic material having hook and loop fasteners which adhere when pressed together (VELCRO).

8. A vehicle cover as defined in claim 3 wherein said multiple closing means positioned around the circumference of the bottom of said sack are selected from the group consisting of a drawstring, strips of synthetic material having hook and loop fasteners which adhere when pressed together (VELCRO), and hooks.

9. A vehicle cover as described in claim 1 wherein a cable means for fastening said sack to a solid object is attached to the interior surface of said sack.

10. A vehicle cover as defined in claim 3 wherein one of the closing means positioned around the circumference of the bottom of said sack is strips of synthetic material which adhere when pressed together (VELCRO), positioned to fasten said sack below the pedals.

11. A vehicle cover as described in claim 1 wherein one of said multiple closing means positioned around the circumference of the bottom of said sack, is a drawstring positioned to close said opening snugly around the bottom of the vehicle.

12. A vehicle cover as described in claim 3 wherein one of the closing means positioned around the circumference of the bottom of said sack, is a drawstring positioned to close said opening snugly around the bottom of the bicycle.

13. A vehicle cover as described in claim 1 wherein a cable means for fastening said sack to a solid object is attached to the interior surface of said sack.

14. A vehicle cover as described in claim 13 wherein said cable means is attached to the interior surface of said sack by means of a grommet, crimping tube, and reinforcing fabric patch.

15. A vehicle cover as described in claim 3 wherein a cable means is positioned on the interior surface of said sack.

16. A vehicle cover as described in claim 15 wherein said cable means is attached to the inner surface of said sack by means of a grommet, crimping tube, and reinforcing fabric patch.

17. A vehicle cover as described in claim 1 wherein;

said sleeve has two strips of material attached thereto;

said strips of material have attached fastening means selected from the group consisting of hooks, belt and buckle, or strips of synthetic material having hook and loop fasteners which adhere when pressed together ie. (VELCRO).

18. A vehicle cover as described in claim 3 wherein the sack contains additional sleeves positioned to accommodate the members of a bicycle rack that engage the frame of a bicycle while said bicycle is covered by said sack.

19. A bicycle cover comprising:

multiple pieces of a flexible lightweight, durable, water resistant material;

said pieces are sewed together to form a sack;

said sack surrounds the bicycle;

said sack has a closed top and an opening at the bottom;

multiple closing means are positioned around the circumference of the bottom of said sack;

a sleeve of flexible lightweight, durable, water resistant material, which is an integrally formed part of said sack extending out of said sack;

said sleeve having an exterior opening and interior opening;

said sleeve being formed to accommodate a locking mechanism attached to said vehicle;

said sleeve having a means for closing said exterior opening;

said sleeve having a second means for closing said interior opening said means for closing said exterior opening is a elasticized draw string;

said means for closing said interior opening is strips of synthetic material having hook and loop fasteners which adhere when pressed together (VELCRO);

one of the said multiple closing means positioned around the circumference of the bottom of said sack is strips of synthetic material having hook and loop fasteners which adhere when pressed together (VELCRO), which are positioned to fasten said sack below the pedals;

four of said multiple closing means positioned around the circumference of the bottom of said sack are strips of synthetic material having hook and loop fasteners which adhere when pressed together (VELCRO), which are positioned to fasten said sack through the front and rear wheels;

one of said multiple closing means positioned around the circumference of the bottom of said sack, is a drawstring positioned to close said opening snugly around the bottom of the bicycle;

a cable means for fastening said sack to a solid object is attached to the inner surface of said sack by means of a grommet, crimping tube, and reinforcing fabric patch;

said sleeve has two strips of material attached thereto;

said strips of material have attached fastening means selected from the group consisting of hooks, belt and buckle, or strips of synthetic material having hook and loop fasteners which adhere when pressed together ie. (VELCRO)

20. A vehicle cover as described in claim 19 wherein the sack contains additional sleeves positioned to accommodate the members of a bicycle rack that engage the frame of a bicycle while said bicycle is covered by said sack.

* * * * *